US012427681B2

(12) United States Patent
Du et al.

(10) Patent No.: US 12,427,681 B2
(45) Date of Patent: Sep. 30, 2025

(54) MULTIFUNCTIONAL CUTTER

(71) Applicant: NINGBO XINGWEI CUTTING-TOOLS TECHNOLOGY CO., LTD., Zhejiang (CN)

(72) Inventors: Jianfu Du, Zhejiang (CN); Mingxiang Pan, Zhejiang (CN); Qi Yao, Zhejiang (CN)

(73) Assignee: NINGBO XINGWEI CUTTING-TOOLS TECHNOLOGY CO., LTD., Zhejiang (CN)

( * ) Notice: Subject to any disclaimer, the term of this patent is extended or adjusted under 35 U.S.C. 154(b) by 302 days.

(21) Appl. No.: 18/185,342

(22) Filed: Mar. 16, 2023

(65) Prior Publication Data

US 2024/0198545 A1 Jun. 20, 2024

(30) Foreign Application Priority Data

Dec. 19, 2022 (CN) ......................... 202211633756.0

(51) Int. Cl.
*B26B 11/00* (2006.01)
*B25G 1/08* (2006.01)
*B26B 5/00* (2006.01)

(52) U.S. Cl.
CPC .............. *B26B 11/006* (2013.01); *B25G 1/08* (2013.01); *B26B 5/00* (2013.01)

(58) Field of Classification Search
None
See application file for complete search history.

(56) References Cited

U.S. PATENT DOCUMENTS

| | | | | |
|---|---|---|---|---|
| 4,955,138 A * | 9/1990 | Henke | A47L 13/08 30/169 |
| 5,819,419 A * | 10/1998 | Schmidt | B43M 7/002 30/294 |
| 8,739,414 B2 * | 6/2014 | Tyers | B26B 11/00 30/162 |
| 10,589,436 B1 * | 3/2020 | Panosian | B26B 1/08 |
| 11,752,613 B2 * | 9/2023 | Christian | B25F 1/04 30/162 |
| 2014/0345146 A1 * | 11/2014 | Schekalla | B26B 3/08 30/169 |
| 2015/0298330 A1 * | 10/2015 | Yu Chen | B26B 3/00 30/280 |

(Continued)

FOREIGN PATENT DOCUMENTS

DE 202023104374 U1 * 10/2023

OTHER PUBLICATIONS

English translation of DE-202023104374-U1, dated Oct. 26, 2023.*

*Primary Examiner* — Hwei-Siu C Payer
(74) *Attorney, Agent, or Firm* — JCIPRNET

(57) ABSTRACT

A multifunctional cutter, including a shank, a blade, and an adjustment assembly is provided. A front side of the shank is provided with a cutting area, and an inner cavity of the shank is respectively communicated with a front end of the shank and the cutting area. The blade is detachably mounted at a front portion of the adjustment assembly. The adjustment assembly is mounted in the inner cavity, and the adjustment assembly is configured to drive, under driving on an outer portion of the shank, the blade to slide along the inner cavity. The blade is configured for providing different functions when the blade moves to different locations.

10 Claims, 14 Drawing Sheets

(1) (2)

(56) References Cited

U.S. PATENT DOCUMENTS

| | | | | |
|---|---|---|---|---|
| 2019/0202074 | A1* | 7/2019 | Chernyshou | B26B 11/00 |
| 2022/0234222 | A1* | 7/2022 | Chen | B26B 5/003 |
| 2024/0198545 | A1* | 6/2024 | Du | B25G 1/08 |

* cited by examiner (1)

(2)

MULTIFUNCTIONAL CUTTER

CROSS-REFERENCE TO RELATED APPLICATION

This application claims the priority benefit of China application serial no. 202211633756.0, filed on Dec. 19, 2022. The entirety of the above-mentioned patent application is hereby incorporated by reference herein and made a part of this specification.

BACKGROUND

Technical Field

The present disclosure relates to the technical field of cutters, and specifically to a multifunctional cutter.

Description of Related Art

As a type of cutter specially used for cutting various cartons, box cutters are sharp and of a small size and therefore have been widely used. Especially with the rapid development of logistics industry nowadays, box cutters are becoming more popular among families. However, conventional box cutters only have the function of cutting cartons, but in the daily life of families, there are often various situations where cutters need to be used, which requires families to be equipped with a variety of cutters with different functions, leading to the increase of daily living costs. Also, the large number of cutters are inconvenient to place. Therefore, there is an urgent need for a cutter with multiple functions.

SUMMARY

One objective of the present disclosure is to provide a cutter capable of realizing multiple functions.

To achieve the above objective, the following technical solutions are adopted in the present disclosure. A multifunctional cutter includes a shank, a blade, and an adjustment assembly. A front side of the shank is provided with a cutting area, and an inner cavity of the shank is respectively communicated with a front end of the shank and the cutting area. The blade is detachably mounted at a front portion of the adjustment assembly. The adjustment assembly is mounted in the inner cavity, and the adjustment assembly is configured to drive, under driving on an outer portion of the shank, the blade to slide along the inner cavity. The blade is configured for cutting when the blade moves to a position where a rear side of the blade is located in the cutting area. The blade is configured for shoveling when the blade moves to a position where a front side of the blade is located outside the front end of the shank. The blade is configured for being replaced when the blade moves to a position where the blade is entirely located outside the front end of the shank.

Preferably, the front side of the shank is provided with an inclined contact surface; and the front side of the shank is provided with a claw portion, the claw portion and the contact surface cooperate with each other to form the cutting area, and an opening direction of the cutting area is inclined relative to an extension direction of the shank.

Preferably, an angle between the opening direction of the cutting area and the extension direction of the shank is defined as a, and a value of the angle $\alpha$ is 30° to 60°.

Preferably, an upper end and/or a lower end of the contact surface is provided with a chamfer surface, so that when the blade is used to cut a to-be-cut workpiece, the blade is configured for inclined cutting.

Preferably, when the blade performs cutting, an angle between the blade and the to-be-cut workpiece is defined as $\beta$, and a value of the angle $\beta$ is 30° to 90°.

Preferably, an upper side of the shank is provided with a first through slot communicated with the inner cavity; the adjustment assembly includes an adjustable block and a supporting plate; the supporting plate is slidably mounted in the inner cavity, and the blade is detachably mounted at a front portion of the supporting plate; the adjustable block is elastically mounted on the supporting plate and extends into the first through slot; when the blade is located at a predetermined position, the adjustable block is configured for locking to the shank by a locking structure; and when a position of the blade needs to be adjusted, the adjustable block is operated to release the locking by the locking structure, and the supporting plate is driven to drive the blade to move.

Preferably, a positioning groove with an opening facing upward is provided on the supporting plate; the adjustable block is slidably mounted in the positioning groove; a lower end of the adjustable block is engaged with a bottom portion of the positioning groove through an elastic member; and the locking structure is configured to be unlocked by pressing the adjustable block.

Preferably, the locking structure includes locking grooves and engaging blocks; the locking structure includes at least two locking grooves, arranged at intervals along at least one side of an extension direction of the first through slot; the engaging blocks are arranged on a corresponding side of the adjustable block; locking of the blade at a predetermined position is realized through engagement of the engaging blocks with the locking grooves at a predetermined position; and the adjustable block is pressed to drive the engaging blocks to disengage from the corresponding locking grooves, to release the locking of the blade at the predetermined position. Alternatively, the locking structure includes at least two engaging blocks, arranged at intervals along at least one side of the extension direction of the first through slot; the locking grooves are arranged on the corresponding side of the adjustable block; locking of the blade at a predetermined position is realized through engagement of the locking grooves with the engaging blocks at the predetermined position; and the adjustable block is pressed to drive the locking grooves to disengage from the corresponding engaging blocks, to release the locking of the blade at the predetermined position.

Preferably, the multifunctional cutter further includes a storage assembly, the storage assembly is mounted at a rear portion of the shank, an accommodating cavity configured to be storable in the inner cavity is provided on the storage assembly, and the accommodating cavity is configured to store a new blade; and when the blade located in the adjustment assembly is to be replaced, the storage assembly is pulled out of the inner cavity, and then a new blade is taken out for replacement.

Preferably, the upper side of the shank is provided with a second through slot communicated with the inner cavity; the storage assembly includes a storage frame and a locking member; the locking member is elastically and slidably mounted in the inner cavity and extends into the second through slot; the accommodating cavity is arranged in the storage frame, and the storage frame is configured to extend into the inner cavity along an opening of a rear end of the shank and be locked by the locking member; and when the blade is to be replaced, the locking member is pressed to unlock the storage frame, making it convenient to pull the storage frame out of the inner cavity.

Preferably, the locking member includes a pressing block and a locking block; the pressing block is spaced apart from and fixed to the locking block by a connecting portion; the pressing block extends into the first through slot, and the locking block is elastically and slidably engaged with a positioning base arranged in the inner cavity through an elastic member; a fastening portion is arranged at a front end of the storage frame; when the storage frame is moved into the inner cavity, the fastening portion is configured to be engaged with a front side of the locking block to realize locking of the storage frame; and when the pressing block is pressed, the locking block is configured to be moved downward to disengage from the fastening portion to unlock the storage frame.

Preferably, a front end of the fastening portion is provided with an inclined first guide surface; an upper end surface of the locking block is an inclined second guide surface; and when the storage frame is moved into the inner cavity, the fastening portion is configured to press the second guide surface through the first guide surface to drive the locking block to move downward, and when the fastening portion crosses the front side of the locking block, the locking block is configured to engage with the fastening portion under an elastic restoring force.

Preferably, the shank includes a shell and two anti-skid strips; engagement slots are respectively provided on a left side and a right side of the shell; the anti-skid strips are configured to slidably engage with the engagement slots on corresponding sides of the shell; and the anti-skid strips are configured to be limited by the storage assembly; or, the anti-skid strips and the engagement slots are limited by a limiting structure.

Preferably, the limiting structure includes a limiting groove and a limiting block; the limiting groove is provided at a rear portion of the engagement slot, the limiting block is arranged on the anti-skid strip, and the anti-skid strip is configured to be limited through engagement of the limiting block and the limiting groove.

Compared with the prior art, the present disclosure has the following beneficial effects.

(1) The adjustment assembly drives the blade to move along the inner cavity by different distances, to realize a cutting function and a shoveling function of the blade as well as a blade replacement function. Compared with the limited functions of conventional box cutters, the present disclosure can realize diversified functions, and is more convenient for the daily use of users.

(2) Different parts of the blade are used for the cutting function and the shoveling function of the cutter, thereby making full use of the blade.

DESCRIPTION OF THE EMBODIMENTS

Figure 1:
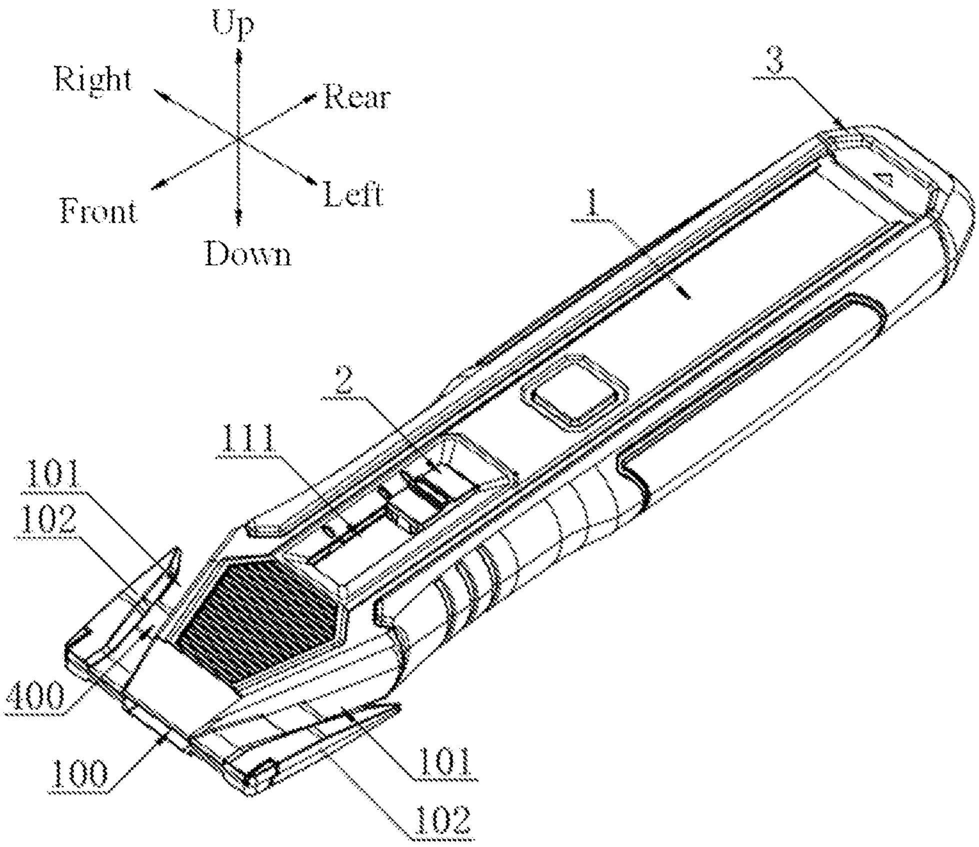
FIG. 1 is a schematic view of an overall structure of the present disclosure along an axial direction.

Hereinafter, the present disclosure will be further described in connection with specific embodiments, and it should be noted that the embodiments described below or the technical features may be arbitrarily combined to form a new embodiment without conflict.

In the description of the present disclosure, it should be noted that the orientation or positional relationships indicated by the terms "center", "transverse", "longitudinal", "length", "width", "thickness", "up", "down", "front", "rear", "left", "right", "vertical", "horizontal", "top", "bottom", "inner", "outer", "clockwise", "counterclockwise", etc. are based on the orientation or positional relationships shown in the drawings, and are only for the convenience of describing the present disclosure and simplifying the description, rather than indicating or implying that the apparatus or element described must have a specific orientation or be constructed and operated in a specific orientation, and therefore are not to be construed as limiting the protection scope of the present disclosure.

It should be noted that in the specification and claims of the embodiments of the present disclosure, the terms "first", "second" or the like are intended to distinguish between similar objects but do not indicate a predetermined order or sequence.

Figure 20:
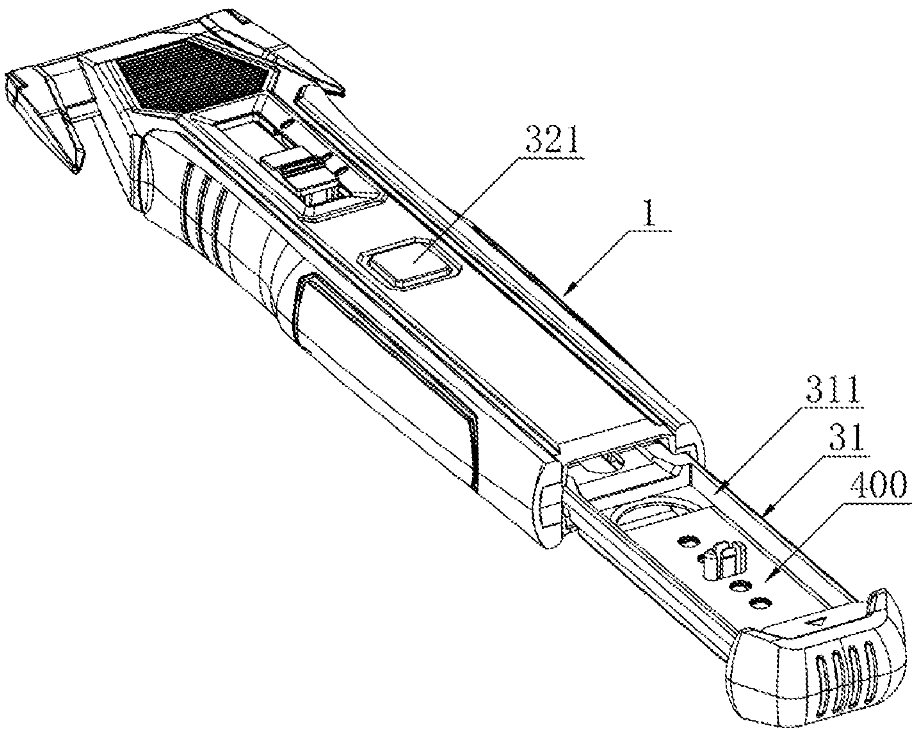
FIG. 20 is a schematic diagram of a state of the storage frame extending out of the shank according to the present disclosure.

In an exemplary embodiment of the present disclosure, as shown in FIG. 1 and FIG. 20, a multifunctional cutter includes a shank 1, a blade 400, and an adjustment assembly 2. A front side of the shank 1 is provided with a cutting area 101, and an inner cavity 100 of the shank 1 is respectively communicated with a front end of the shank 1 and the cutting area 101. The blade 400 is detachably mounted at a front portion of the adjustment assembly 2. The adjustment assembly 2 is mounted in the inner cavity 100, and the adjustment assembly 2 is configured to drive, under driving on an outer portion of the shank 1, the blade 400 to slide along the inner cavity 100. The blade 400 is configured for realizing a cutting function of the cutter when the blade 400 moves to a position where a rear side of the blade is located in the cutting area 101. The blade 400 is configured for realizing a shoveling function of the cutter when the blade 400 moves to a position where a front side of the blade is located outside the front end of the shank 1. A function of replacing the blade 400 can be realized for the cutter when the blade 400 is entirely located outside the front end of the shank 1.

It can be understood that, when the rear side of the blade 400 is located in cutting area 101, the combined structure of the blade 400 and the shank 1 is the same or similar to that of a conventional box cutter, so the cutting function of the conventional box cutter can be realized through the blade 400. When the front side of the blade 400 is located outside the front end of the shank 1, the combined structure of the blade 400 and the shank 1 is the same or similar to that of a conventional shovel, so the shoveling function of the conventional shovel can be realized through the blade 400. When the blade 400 is entirely located outside the front end of the shank 1, the blade 400 can be removed and replaced with a new blade 400 by the detachable connection between the blade 400 and the adjustment assembly 2. Therefore, compared with the limited functions of conventional box cutters, the present disclosure can realize diversified cutter functions, and is more convenient for the daily use of users.

Figure 2:
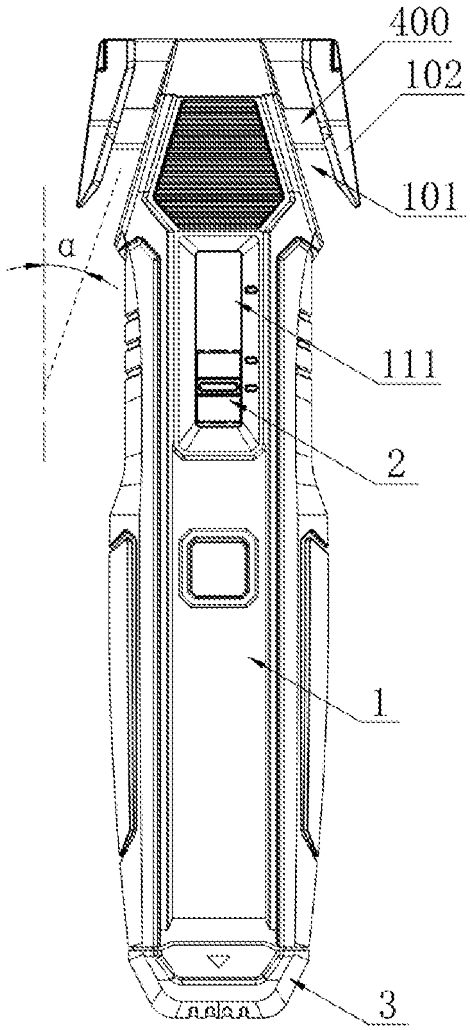
FIG. 2 is a schematic view of an overall structure of the present disclosure along a top-view direction.
Figure 3:
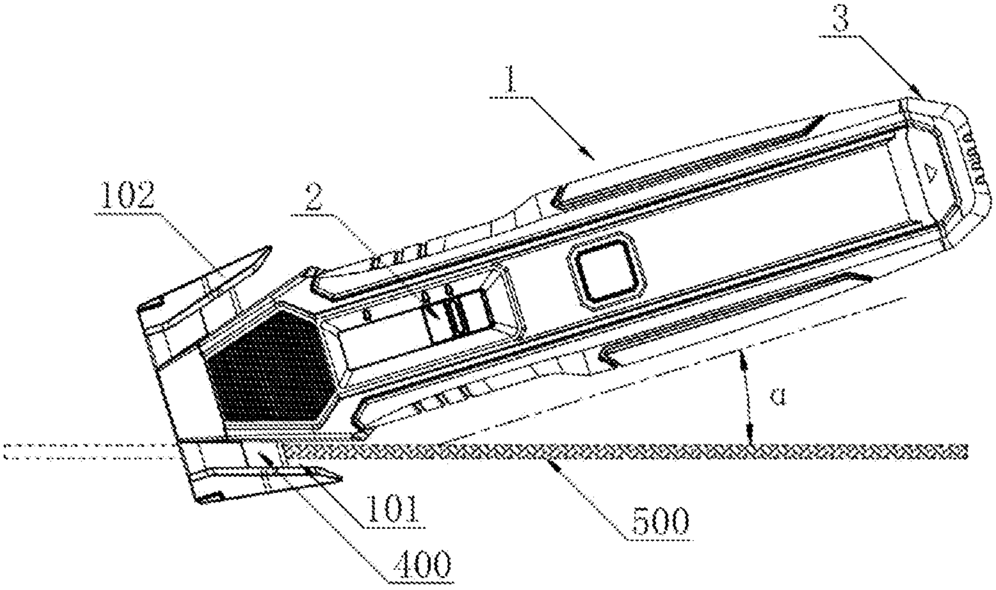
FIG. 3 is a schematic view of a state of the present disclosure when performing a cutting function.

In this embodiment, as shown in FIG. 1 to FIG. 3, the cutting area 101 may be arranged on one side of the front portion of the shank 1, or on each of two sides of the front portion of the shank 1. The specific number of the cutting areas 101 may be selected according to actual needs. In order to improve the utilization rate and the symmetry and aesthetics in appearance of the cutter, in this embodiment, the cutting area 101 is preferably arranged on each of the two sides of the front portion of the shank 1.

It can be understood that, when the cutter is used for the cutting function, two ends of the rear side of the blade 400 are located in the cutting area 101 respectively for cutting. When the cutter is used for the shoveling function, shoveling is realized through the front side of the blade 400. This effectively improves the utilization rate of the blade 400 compared with a conventional blade 400 of which only one side can be used. Of course, when one side of the blade 400 is seriously worn due to frequent use of the cutting or shoveling function, the blade 400 may be turned around and continues to be used, thereby further improving the utilization rate of the blade 400.

In this embodiment, as shown in FIG. 1 to FIG. 3 and FIG. 6 to FIG. 9, the front side of the shank 1 is provided with an inclined contact surface 115. The front side of the shank 1 is provided with a claw portion 102. The claw portion 102 and the contact surface 115 may cooperate with each other to form the cutting area 101. An opening direction of the cutting area 101 is inclined relative to an extension direction of the shank 1. An angle between the opening direction of the cutting area 101 and the extension direction of the shank 1 is defined as a, and a value of the angle $\alpha$ is 30° to 60°.

It should be noted that, as shown in FIG. 3, when the cutting tool is used for the cutting function, an angle gap exists between the shank 1 and a to-be-cut workpiece 500 due to the holding of the shank 1 by a user's palm. The angle gap is the angle $\alpha$. In order to avoid contact between fingers and the to-be-cut workpiece 500 during cutting of the to-be-cut workpiece 500, the value of the angle $\alpha$ is at least 30°. Because a too large angle $\alpha$ is inconvenient for the user to operate the shank 1, a maximum value of the angle $\alpha$ is generally 60° to 70°, preferably 60°.

Specifically, as shown in FIG. 6 to FIG. 9 and FIG. 11, the shank 1 includes an upper housing 11 and a lower housing 12. Each of two sides of a front portion of each of the upper housing 11 and the lower housing 12 is provided with the contact surface 115, so that when the upper housing 11 and the lower housing 12 are combined with each other, the contact surfaces 115 on the corresponding sides of the upper housing 11 and the lower housing 12 are aligned with each other. In addition, the two sides of the front portion of the upper housing 11 are each provided with a first claw plate 114 separated from the contact surface 115, and the two sides of the front portion of the lower housing 12 are each provided with a second claw plate 121 separated from the contact surface 115, so that when the upper housing 11 and the lower housing 12 are combined with each other, the first claw plate 114 and the second claw plate 121 on the corresponding side can be combined with each other to form the claw portion 102.

It should be noted that the claw portion 102 has a sharp tip so that the cutter can pierce the to-be-cut workpiece 500 through the sharp tip of the claw portion 102 when cutting the to-be-cut workpiece 500. During the subsequent cutting process using the blade 400, the claw portion 102 can position the to-be-cut workpiece 500 to prevent the to-be-cut workpiece 500 from detaching from the cutter during the cutting process.

Figure 4:
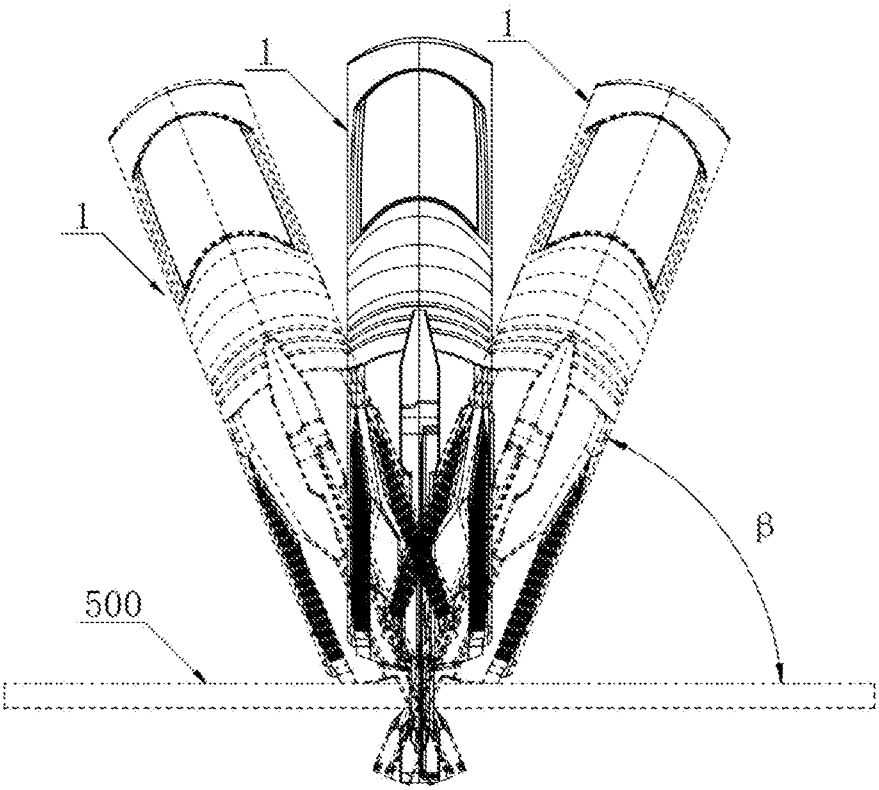
FIG. 4 is a schematic view of a state of the present disclosure when performing cutting at different angles.
Figure 7:
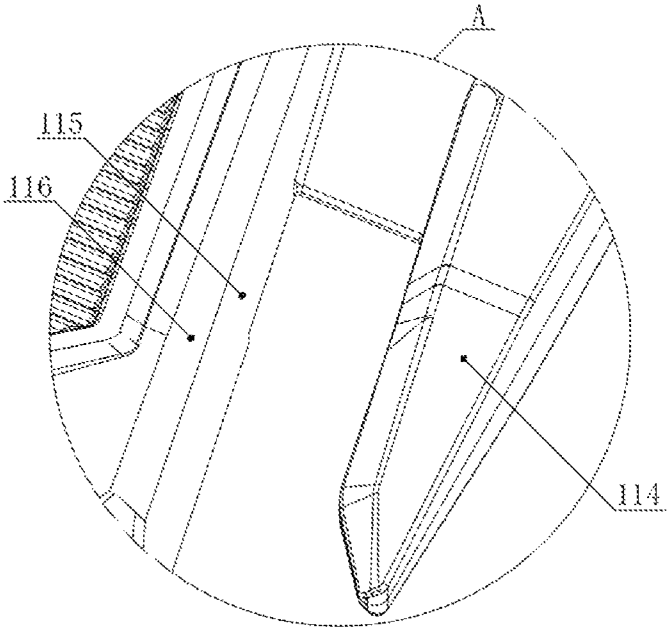
FIG. 7 is a partially enlarged view of part A in FIG. 6 according to the present disclosure.
Figure 11:
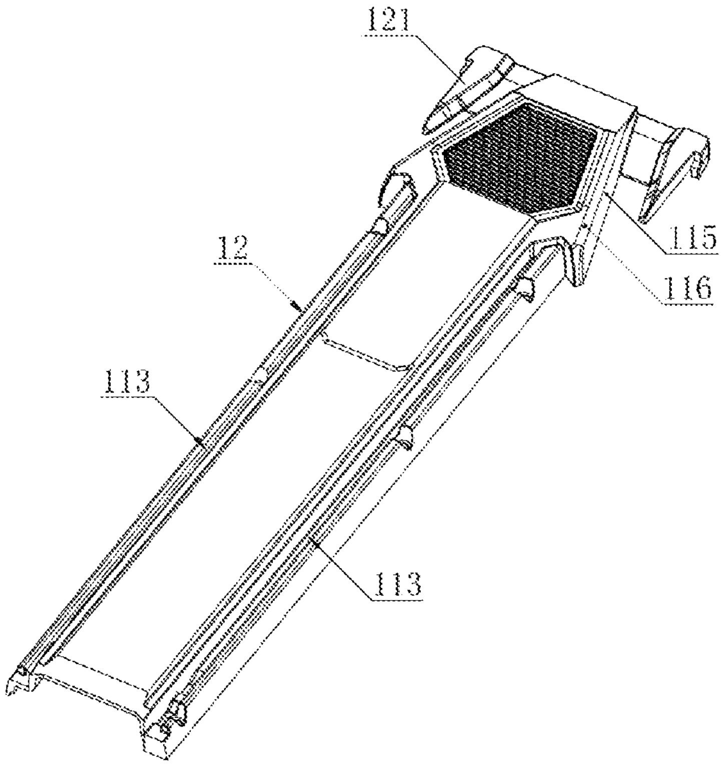
FIG. 11 is a schematic structural view of a lower housing according to the present disclosure.

In this embodiment, as shown in FIG. 4, FIG. 7, and FIG. 11, an upper end and/or a lower end of the contact surface 115 is provided with a chamfer surface 116, and the chamfer surface 116 is inclined, so that when the blade 400 is used to cut the to-be-cut workpiece 500, the blade 400 can perform inclined cutting. When the blade 400 performs cutting, an angle between the blade 400 and the to-be-cut workpiece 500 is defined as $\beta$, and a value of the angle $\beta$ is 30° to 90°.

It can be understood that, as shown in FIG. 3, because the contact surface 115 is a plane, the contact surface 115 and the to-be-cut workpiece 500 are generally kept parallel during cutting using the cutter, to reduce the resistance and ensure the smooth cutting. This cutting mode is referred to as straight cutting. In practical use, in order to adapt to users' usage habits and cope with more usage scenarios, the cutter is often required to perform inclined cutting. Therefore, as shown in FIG. 4, in order to ensure that the cutter can perform inclined cutting, end portions of the contact surface 115 on each of the two sides of the front portion of the upper housing 11 and/or the lower housing 12 are configured as inclined chamfer surfaces 116. An angle between the chamfer surface 116 and the contact surface 115 is 90°−$\beta$. When the angle $\beta$ is 90°, the cutter can only perform straight cutting.

It should be noted that to-be-cut workpiece 500 may be a commonly seen cardboard or other items that need to be cut in daily life.

In this embodiment, as shown in FIG. 5, FIG. 6, FIG. 8, FIG. 11, and FIG. 12, the shank 1 includes a shell and two anti-skid strips 13 of a flexible material. Engagement slots 113 are respectively provided on a left side and a right side of the shell. The anti-skid strips 13 are slidably engaged with the engagement slots 113 on the corresponding sides of the shell, so that the anti-skid strips 13 can improve the comfort of holding the handle 1 and improve the anti-skid performance of the shank 1. Relative positions of the anti-skid strips 13 and the engagement slots 113 may be limited by a limiting structure, so as to prevent the anti-skid strips 13 from detaching from the shell due to an excessive force applied in the cutting or shoveling process.

Specifically, as shown in FIG. 5, FIG. 6, FIG. 8, FIG. 11, and FIG. 12, the shell includes the upper housing 11 and the lower housing 12. Two sides of an upper end surface of the upper housing 11 and two sides of a lower end surface of the lower housing 12 are each provided with the engagement slot 113. Therefore, when the upper housing 11 and the lower housing 12 are combined with each other, the engagement slots 113 on the corresponding sides of the upper housing 11 and the lower housing 12 can be symmetrical with each other. A cross-section of the anti-skid strip 13 is substantially U-shaped, and each of two sides of the anti-skid strip 13 is provided with a vertically extending buckling portion 131. Therefore, when the anti-skid strips 13 are mounted on the shell, the anti-skid strips 13 can cover the two sides of the upper housing 11 and the lower housing 12, and the anti-skid strips 13 can be slidably engaged with the engagement slots 113 symmetrically arranged on the two sides of the shell through the buckling portions 131.

Figure 8:
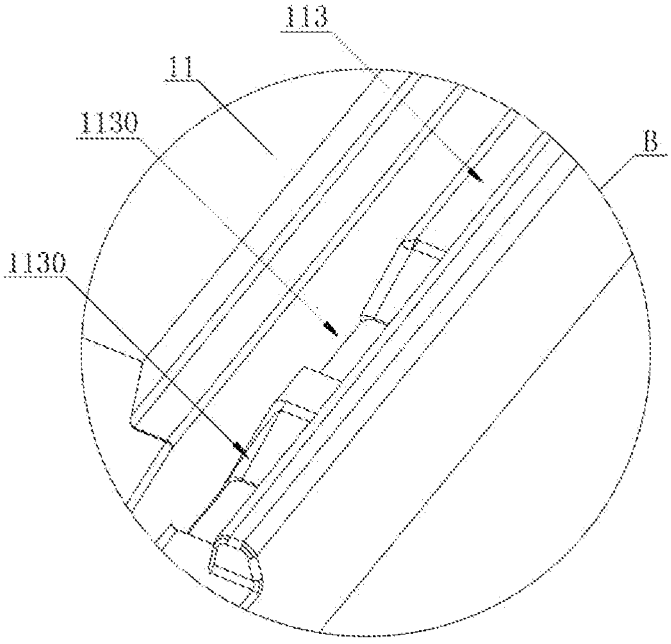
FIG. 8 is a partially enlarged view of part B in FIG. 6 according to the present disclosure.
Figure 12:
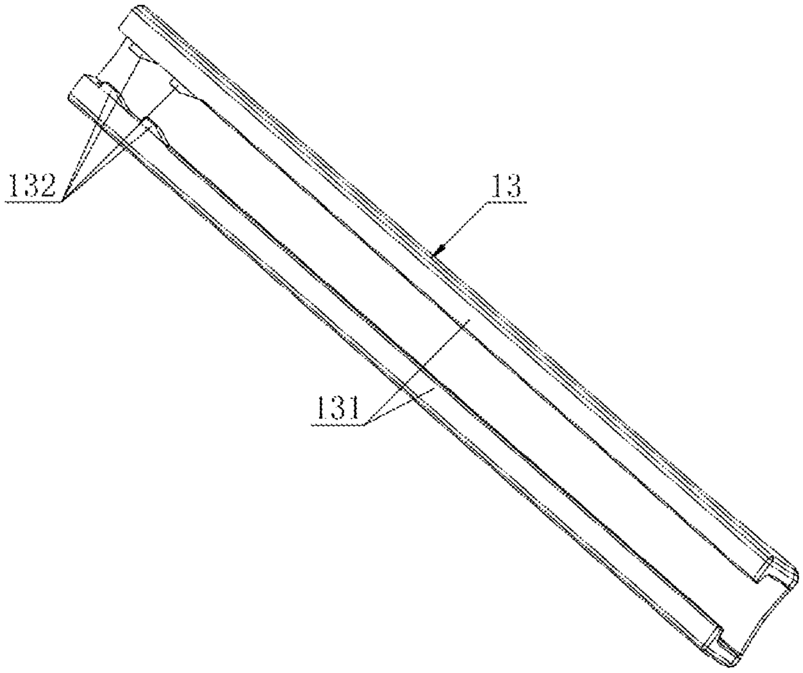
FIG. 12 is a schematic structural view of an anti-skid strip according to the present disclosure.

In this embodiment, as shown in FIG. 8, FIG. 11, and FIG. 12, the limiting structure includes a limiting groove 1130 and a limiting block 132. The limiting groove 1130 is provided at a rear portion of the engagement slot 113, and the limiting block 132 is arranged at a corresponding rear portion of the buckling portion 131. Therefore, in the process of mounting the anti-skid strips 13 on the two sides of the shell, the positions of the anti-skid strips 13 can be limited through engagement of the limiting blocks 132 and the limiting grooves 1130.

It can be understood that the specific numbers of limiting grooves 1130 and limiting blocks 132 can be set according to actual needs. For example, as shown in FIG. 8 and FIG. 12, the number of limiting grooves 1130 is two, and correspondingly, the number of limiting blocks 132 is two.

For ease of understanding, the specific mounting process of the anti-skid strips 13 is as follows: Firstly, the upper housing 11 and the lower housing 12 are combined with and fixed to each other by fasteners to form a complete shell, so that the left and right sides of the shell is each provided with a pair of symmetrical engagement slots 113. Then, the front end of one anti-skid strip 13 is aligned with one side of the rear end of the shell, and then the anti-skid strip 13 is pushed to slide the buckling portion 131 along the engagement slot 113 on the corresponding side of the shell until the front end of the anti-skid strip 13 presses against a front end of the engagement slot 113. In this case, the limiting block 132 at the rear portion of buckling portion 131 is exactly engaged with the engagement slot 113 at the rear portion of the limiting groove 1130. Then the above process is repeated to mount another anti-skid strip 13 on the other side of the shell.

In an embodiment of the present disclosure, as shown in FIG. 1, FIG. 2, FIG. 5, FIG. 6 and FIG. 13 to FIG. 15, an upper side of the shank 1 is provided with a first through slot 111 communicated with the inner cavity 100. The adjustment assembly 2 includes an adjustable block 23 and a supporting plate 21. The supporting plate 21 is slidably mounted in the inner cavity 100. The blade 400 is detachably mounted in a mounting portion 211 at a front portion of the supporting plate 21. The adjustable block 23 is elastically mounted on the supporting plate 21 and extends into the first through slot 111. When the blade 400 is located at a predetermined position, the adjustable block 23 may be locked to the shank 1 by a locking structure. When a position of the blade 400 needs to be adjusted, the adjustable block 23 may be operated to release the locking by the locking structure, and the supporting plate 21 is driven to drive the blade 400 to move.

It can be understood that a predetermined position of the blade 400 includes a position corresponding to the cutting function, a position corresponding to the shoveling function, and a position corresponding to replacement of the blade 400.

Figure 13:
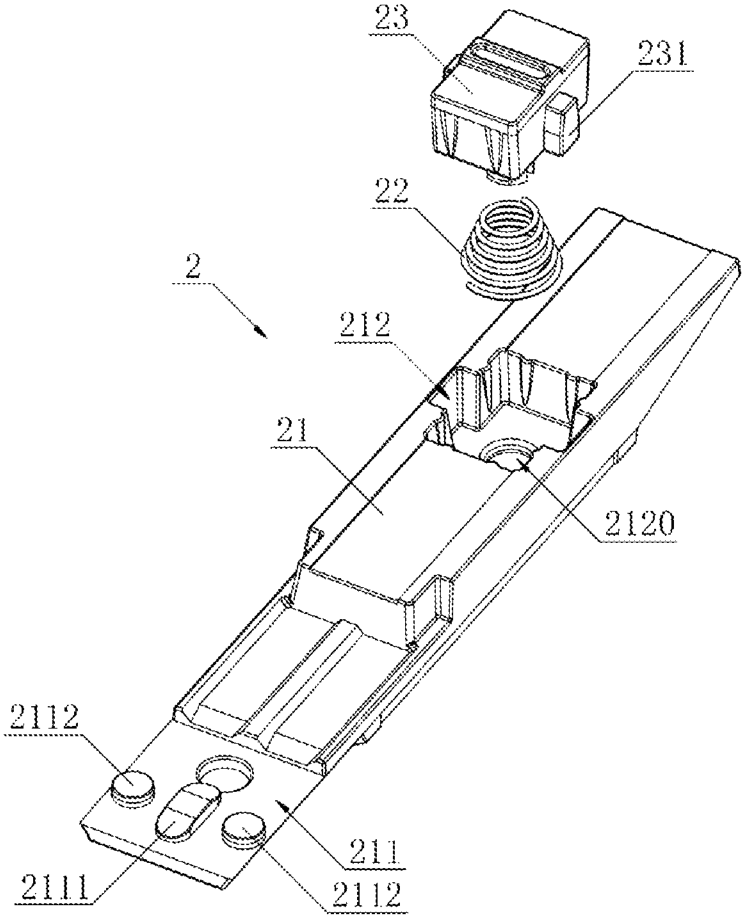
FIG. 13 is a schematic exploded view of an adjustment assembly according to the present disclosure.
Figure 14:
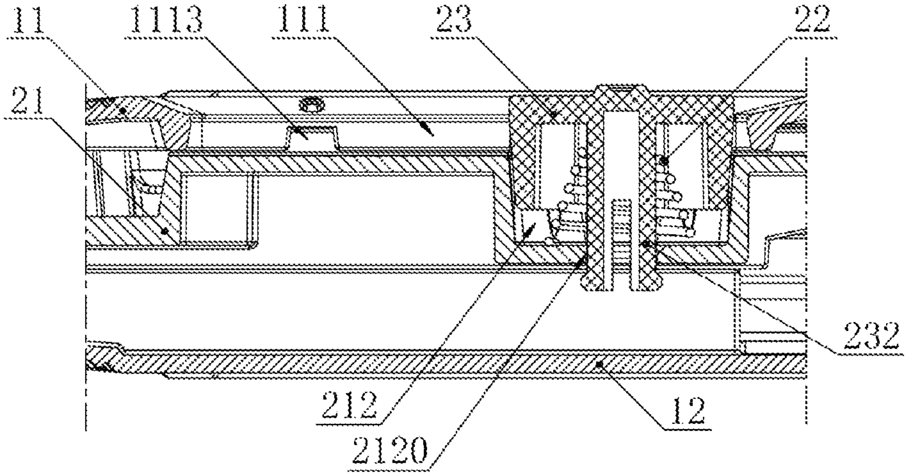
FIG. 14 is a schematic diagram of a state when the adjustment assembly performs function switching according to the present disclosure.
Figure 14:
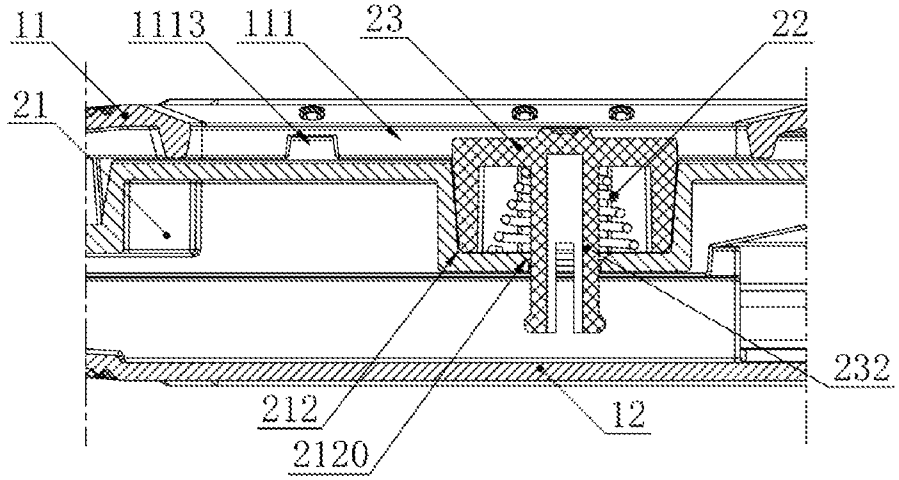

In this embodiment, as shown in FIG. 13 and FIG. 14, a positioning groove 212 with an opening facing upward is provided on the supporting plate 21; and the adjustable block 23 is slidably mounted in the positioning groove 212. In addition, a lower end of the adjustable block 23 is engaged with a bottom portion of the positioning groove 212 through an elastic member, and the locking structure is unlocked by pressing the adjustable block 23 down to drive the adjustable block 23 to slide along the positioning groove 212.

It can be understood that the specific structure of the elastic member is known to those skilled in the art, and commonly seen elastic members may be springs, elastic sheets, or the like.

It can also be understood that in the design of the positioning groove 212, in order to ensure the smooth sliding of the adjustable block 23, the size of the positioning groove 212 needs to be slightly larger than that of the adjustable block 23. As a result, there is a certain shaking space after the adjustable block 23 is mounted in the positioning groove 212. Moreover, when an upper side of the cutter is turned down, the adjustable block 23 may fall from the first through slot 111.

In order to ensure the mounting stability of the adjustable block 23, as shown in FIG. 13 and FIG. 14, the supporting plate 21 is provided with a positioning hole 2120 running through the bottom portion of the positioning groove 212, and a positioning rod 232 is arranged at the lower end of the adjustable block 23. A size of an end portion of the positioning rod 232 in a normal state is larger than a size of the positioning hole 2120, and the end portion of the positioning rod 232 is shrinkable. Furthermore, during the mounting of the adjustable block 23, the end portion of the positioning rod 232 may shrink to pass through the positioning hole 2120. In this way, in the process of pressing the adjustable block 23, the adjustable block 23 may slide along the positioning hole 2120 through the positioning rod 232.

It can be understood that after the positioning rod 232 is arranged at the lower portion of the adjustable block 23, in order to facilitate the arrangement of the elastic member between the adjustable block 23 and the bottom of the positioning groove 212, the elastic member is preferably a spring, which may be defined as a first spring 22. The first spring 22 may be sleeved over the positioning rod 232.

Figure 6:
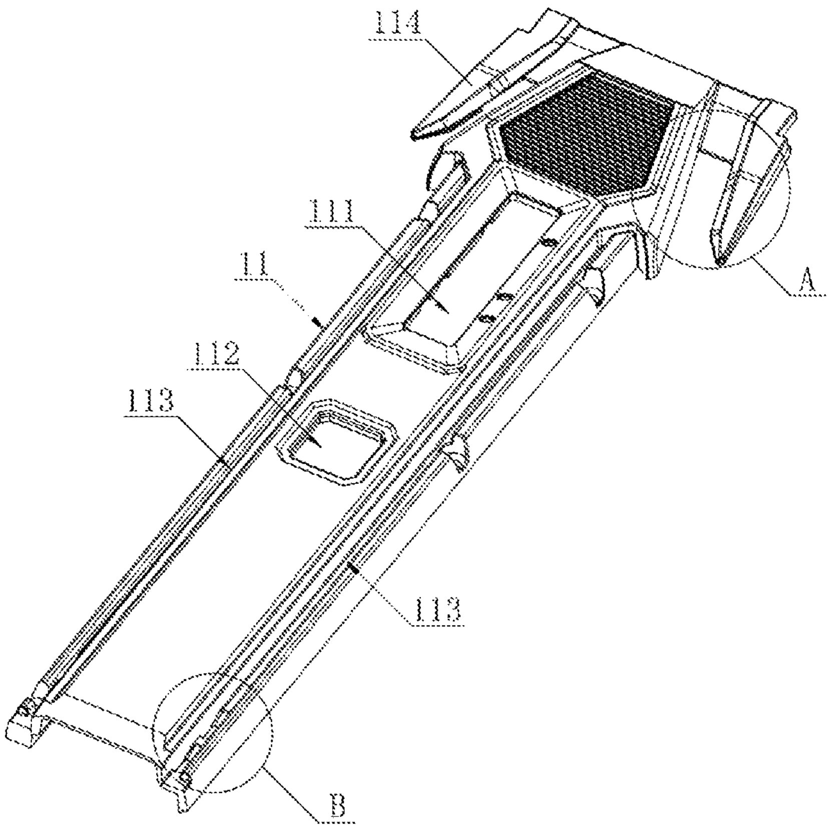
FIG. 6 is a schematic structural front view of an upper housing according to the present disclosure.

In this embodiment, as shown in FIG. 6, the first through slot 111 is provided on the upper housing 11; and an extension direction of the first through slot 111 is parallel to a length direction of the shank 1. Therefore, the adjustable block 23 can slide along the extension direction of the first through slot 111 to drive the supporting plate 21 to move the blade 400 to a predetermined position. Further, in order to facilitate the locking of the blade 400 by the locking structure, the locking structure may be arranged at a side portion of the first through slot 111 along the extension direction.

Specifically, the locking structure includes a locking groove and an engaging block 231. The locking groove and the engaging block 231 may be arranged in various manners, including but not limited to the following two arrangement manners:

Arrangement manner 1: As shown in FIG. 9, FIG. 10, FIG. 13, and FIG. 14, there are at least two locking grooves, arranged at intervals along at least one side of the extension direction of the first through slot 111. The engaging block 231 is arranged on the corresponding side of the adjustable block 23. In this way, the locking of the blade 400 at a predetermined position can be realized through the engagement of the engaging block 231 with the locking groove at the predetermined position. The adjustable block 23 is pressed to drive the engaging block 231 to disengage from the corresponding locking groove, to release the locking of the blade 400 at the predetermined position.

Arrangement manner 2: there are at least two engaging blocks 231, arranged at intervals along at least one side of the extension direction of the first through slot 111. The locking groove is arranged on the corresponding side of the adjustable block 23. In this way, the locking of the blade 400 at a predetermined position can be realized through the engagement of the locking groove with the engaging block 231 at the predetermined position. The adjustable block 23 is pressed to drive the locking groove to disengage from the corresponding engaging block 231, to release the locking of the blade 400 at the predetermined position.

It can be understood that in order to facilitate the description of subsequent contents, the specific arrangement manner of the locking groove and the engaging block 231 takes the arrangement manner 1 as an example.

It can also be understood that the cutter in this embodiment includes at least three functions such as cutting, shoveling, and replacement of the blade 400. As the blade 400 needs to bear a force during cutting and shoveling, locking of the blade 400 is required. Therefore, the number of locking grooves is at least two, to ensure that locking of the blade 400 is realized by engagement of the corresponding locking groove and engaging block 231 during cutting and shoveling using the blade 400.

Of course, in order to ensure that the blade 400 can be replaced when the cutter is at any angle, the blade 400 may also be locked by the locking structure during replacing the blade 400. That is, the number of locking grooves is at least three, and the three locking grooves are arranged at intervals.

Of course, in order to further improve the structural stability of the adjustable block 23 during locking, there may be at least three pairs of locking grooves, and two locking grooves of each pair are symmetrically arranged on two sides of the extension direction of the first through slot 111. In this case, the engaging block 231 is arranged on each of the two corresponding sides of the adjustable block 23.

Figure 9:
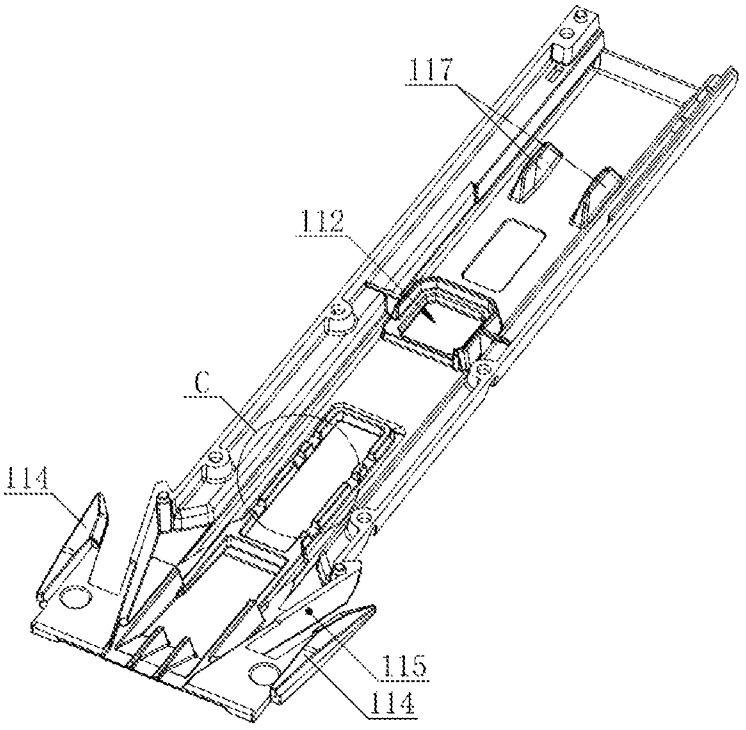
FIG. 9 is a schematic structural back view of the upper housing of the present disclosure.
Figure 10:
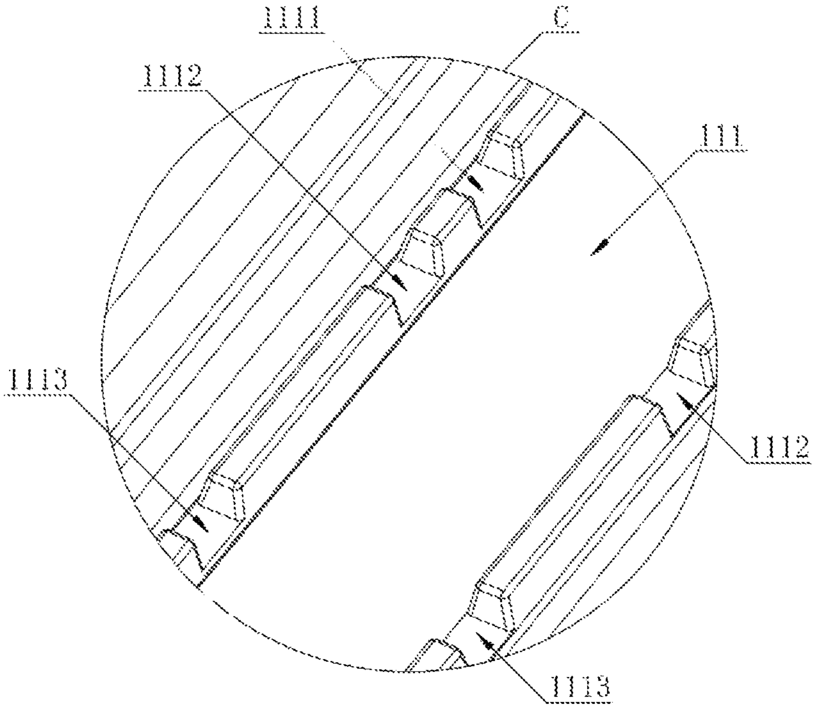
FIG. 10 is a partially enlarged view of part C in FIG. 9 according to the present disclosure.

In this embodiment, as shown in FIG. 9, FIG. 13, and FIG. 14, a first mark corresponding to the position of the engaging block 231 is provided on an upper end surface of the adjustable block 23, and a second mark corresponding to the position of the locking groove is provided on a side portion of the first through slot 111 on the upper end surface of the upper housing 11. Therefore, during adjustment of the position of the blade 400, the user can determine a position at which the engaging block 231 is engaged with the corresponding locking groove according to positions of the first mark and the second mark, making it convenient for the user to use.

Figure 5:
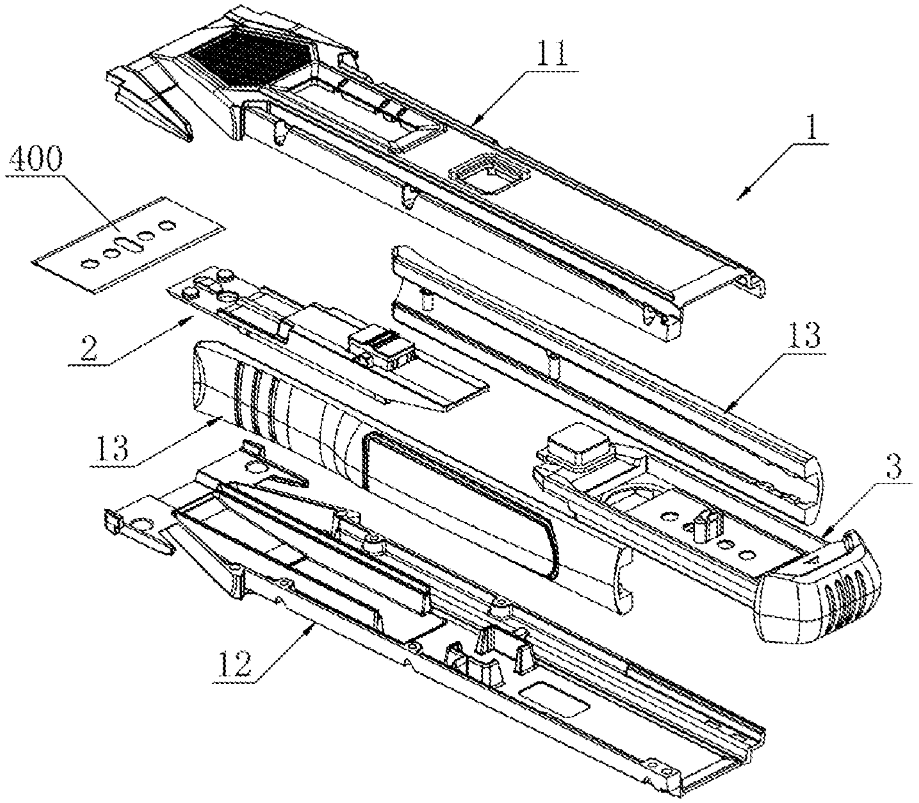
FIG. 5 is a schematic exploded view of the present disclosure.

In order to improve the applicability of the blade 400 in the present disclosure, an existing product available in the market is used as the blade 400 in the present disclosure. For example, as shown in FIG. 5, a first positioning hole is provided in a middle portion of the blade 400, and at least one second positioning hole is provided on each of two sides of the first positioning hole. In this case, as shown in FIG. 13, the mounting portion 211 includes a positioning rib 2111 and at least one pair of positioning columns 2112. The positioning rib 2111 is arranged in a middle portion of a front end of the supporting plate 21, and the positioning columns 2112 are symmetrically arranged on two sides of the positioning rib 2111. Therefore, when the blade 400 is mounted in the mounting portion 211, the blade 400 is engaged with the positioning rib 2111 through the first positioning hole, and engaged with the corresponding positioning columns 2112 through the second positioning holes. In this way, the multi-point positioning of the blade 400 can prevent the blade 400 from shaking during use.

Specifically, heights of the positioning rib 2111 and the positioning column 2112 need to be greater than a thickness of the blade 400, to ensure that there is a height different between the blade 400 and the positioning rib 2111 and the positioning column 2112 after mounting, thereby ensuring that the blade 400 will not fall off during use.

It can be understood that, since the heights of the positioning rib 2111 and the positioning column 2112 are greater than the thickness of the blade 400, there is a spacing between the blade 400 and the mounting space after the blade 400 is mounted in the mounting space. In order to prevent the blade 400 from shaking up and down along the spacing during use, the blade 400 may be limited by a limiting structure. The limiting structure may be of various specific structures, among which an elastic limiting structure and a magnetic limiting structure are commonly used.

Specifically, the elastic limiting structure includes an elastic member mounted between the blade 400 and an inner side of the upper housing 11. After the mounting of the blade 400 is completed, the elastic member presses against the blade 400 by an elastic force to prevent the blade 400 from shaking. Commonly used elastic members include a spring, an elastic piece, etc.

The magnetic limiting structure includes a magnet, which may be fixedly mounted at the mounting portion 211, so that after the blade 400 is mounted in the mounting portion 21, the magnet attracts the blade 400, to prevent the blade 400 from shaking. Of course, the magnet may also be fixedly mounted on an inner side of the lower housing 12.

In order to facilitate understanding, a specific working process of the adjustment assembly 2 will be described in detail below. The locking grooves include a first locking groove 1111, a second locking groove 1112, and a third locking groove 1113 in sequence from back to front.

(1) When the cutter is used for the cutting function, as shown in FIG. 1 to FIG. 4 and section (1) of FIG. 14, the adjustable block 23 is engaged with the first locking groove 1111 through the engaging block 231, so that the rear side of the blade 400 on the mounting portion 211 at the front portion of the supporting plate 21 is located in cutting area 101. The user may grip the shank 1 to operate the blade 400 in the cutting area 101 to cut the to-be-cut workpiece.

Figure 15:
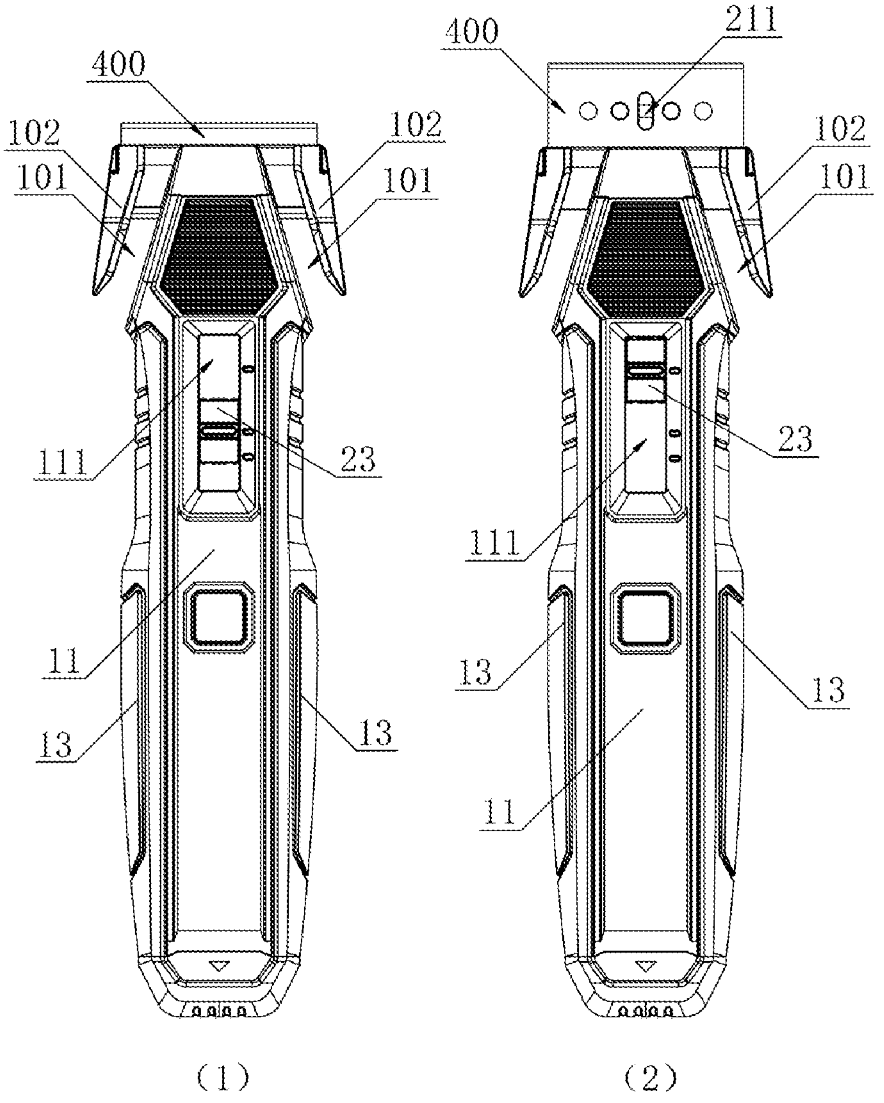
FIG. 15 is a schematic structural diagram of the present disclosure switched to different functions.
Figure 16:
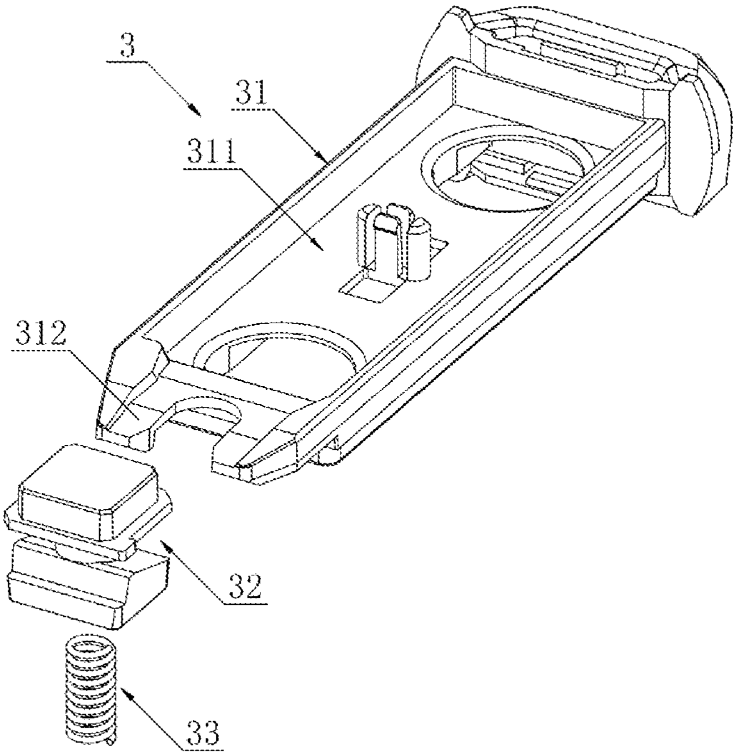
FIG. 16 is a schematic exploded view of a storage assembly according to the present disclosure.

(2) When the cutter is used for the shoveling function, as shown in section (2) of FIG. 14 and section (1) of FIG. 15, the adjustable block 23 is pressed and slid downward along the positioning groove 212 to compress the first spring 22 until the engaging block 231 on the side portion of the adjustable block 23 detaches from the first locking groove 1111. Then the adjustable block 23 is kept pressed and pushed forward along the first through slot 111 until the engaging block 231 on the side portion of the adjustable block 23 is aligned with the second locking groove 1112. In this case, the adjustable block 23 is released, so that the adjustable block 23 can slide upward along the positioning groove 212 under an elastic force of the first spring 22 until the engaging block 231 on the side portion of the adjustable block 23 is engaged with the second locking groove 1112. Moreover, during the movement of the adjustable block 23, the adjustable block 23 presses against the side portion of the positioning groove 212 to drive the supporting plate 21 to drive the blade 400 to move forward, until the front side of the blade 400 moves to the outside of the front end of the shank 1. The user may grip the shank 1 to operate the blade 400 to shovel a wall, floor or desktop.

(3) When the blade 400 needs to be replaced for the cutter, as shown in section (2) of FIG. 15, the adjustable block 23 is pressed and slid downward along the positioning groove 212 to compress the first spring 22 until the engaging block 231 on the side portion of the adjustable block 23 detaches from the second locking groove 1112. Then the adjustable block 23 is kept pressed and pushed forward along the first through slot 111 until the engaging block 231 on the side portion of the adjustable block 23 is aligned with the third locking groove 1113. In this case, the adjustable block 23 is released, so that the adjustable block 23 can slide upward along the positioning groove 212 under an elastic force of the first spring 22 until the engaging block 231 on the side portion of the adjustable block 23 is engaged with the third locking groove 1113. Moreover, during the movement of the adjustable block 23, the adjustable block 23 presses against the side portion of the positioning groove 212 to drive the supporting plate 21 to drive the blade 400 to move forward, until the blade 400 completely moves to the outside of the front end of the shank 1. Then the user can turn around the blade 400 or replace the blade 400 with a new blade 400 to realize the replacement function.

In an embodiment of the present disclosure, as shown in FIG. 1 to FIG. 3, FIG. 5, and FIG. 16 to FIG. 20, the multifunctional cutter further includes a storage assembly 3. The storage assembly 3 is mounted at a rear portion of the shank 1. The storage assembly 3 is provided with an accommodating cavity 311 that is configured to be storable in the inner cavity 100. The accommodating cavity 311 is configured to store a new blade 400. Therefore, when the blade 400 in the adjustment assembly 2 needs to be replaced with a new blade 400, the storage assembly 3 is directly pulled out from the inner cavity 100, and then the new blade 400 is taken out from the accommodating cavity 311 for replacement. Whereby, the replacement efficiency of the blade 400 is effectively improved, providing a good user experience.

In this embodiment, as shown in FIG. 6, FIG. 9, and FIG. 16 to FIG. 20, the upper side of the shank 1 is provided with a second through slot 112 communicated with the inner cavity 100. The storage assembly 3 includes a storage frame 31 and a locking member 32. The locking member 32 is elastically and slidably mounted in the inner cavity 100 and extends into the second through slot 112. The accommodating cavity 311 is arranged in the storage frame 31. The storage frame 31 may extend into the inner cavity 100 along an opening of a rear end of the shank 1 and be locked by the locking member 32. When the blade 400 needs to be replaced, the locking member 32 is pressed to unlock the storage frame 31, and then the storage frame 31 is directly pulled out of the inner cavity 100.

Specifically, as shown in FIG. 6, FIG. 9, and FIG. 16 to FIG. 20, the second through slot 112 is provided on the upper housing 11; and a positioning base 122 aligned with second through slot 112 is arranged on the inner side of the lower housing 12. The locking member 32 is slidably mounted on the positioning base 122 to ensure that locking member 32 can only slide up and down along an opening direction of the second through slot 112. A locking block 322 is further connected to the positioning base 122 by an elastic member. Commonly used elastic members include an elastic piece, a spring, etc. In order to facilitate subsequent description, the elastic member in this embodiment is preferably a spring, which may be defined as a second spring 33.

In this embodiment, as shown in FIG. 16 to FIG. 19, the locking member 32 includes a pressing block 321 and the locking block 322. The pressing block 321 is spaced apart from and fixed to the locking block 322 by a connecting portion. The pressing block 321 may extend into the [first] second through slot 112, and the locking block 322 may be elastically and slidably engaged with the positioning base 122 through the second spring 33. A fastening portion 312 is arranged at a front end of the storage frame 31. When the storage frame 31 is moved into the inner cavity 100, the fastening portion 312 is engaged with a front side of the locking block 322 to lock the storage frame 31. When the pressing block 321 is pressed, the locking block 322 may be moved downward along the positioning base 122 to disengage from the fastening portion 312, to unlock the storage frame 31, making it convenient for the user to directly pull the storage frame 31 out of the inner cavity 100.

It can be understood that the unlocking of the storage frame 31 may be realized by pressing the pressing block 321 downward. When the storage frame 31 is stored in the inner cavity 100, the storage frame 31 and the locking member 32 may be engaged with each other by pressing the pressing block 321 downward again, or may be locked by an automatic fastening structure.

Figure 17:
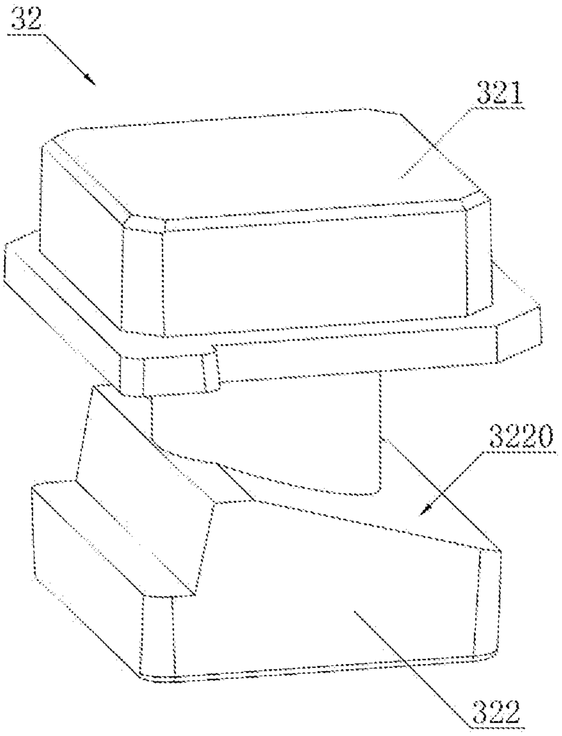
FIG. 17 is a schematic structural diagram of a locking member according to the present disclosure.
Figure 18:
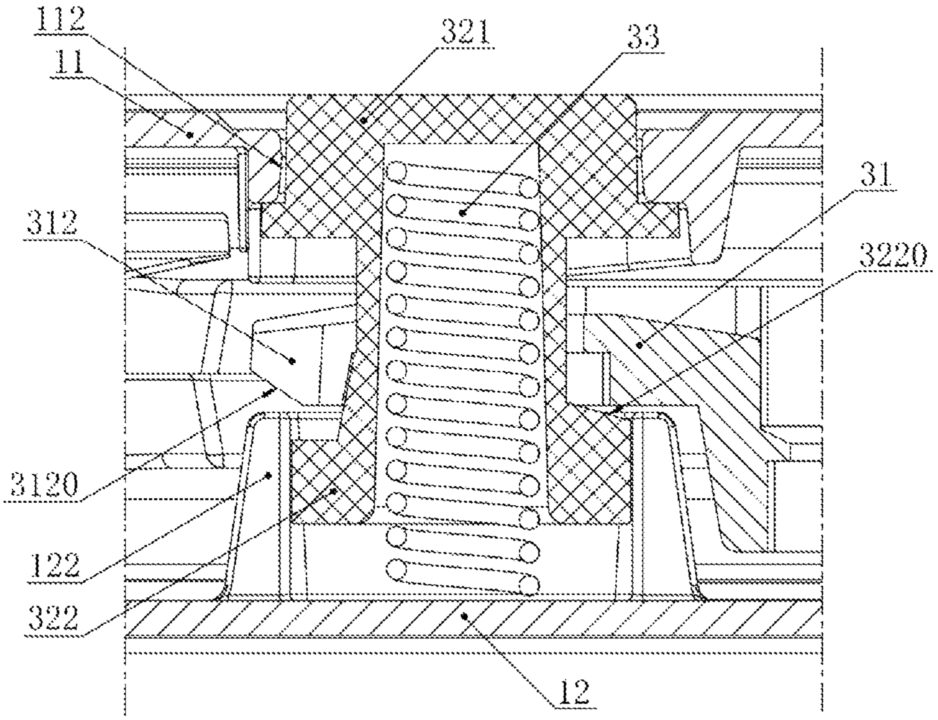
FIG. 18 is a schematic diagram of a state when the locking member locks a storage frame according to the present disclosure.
Figure 19:
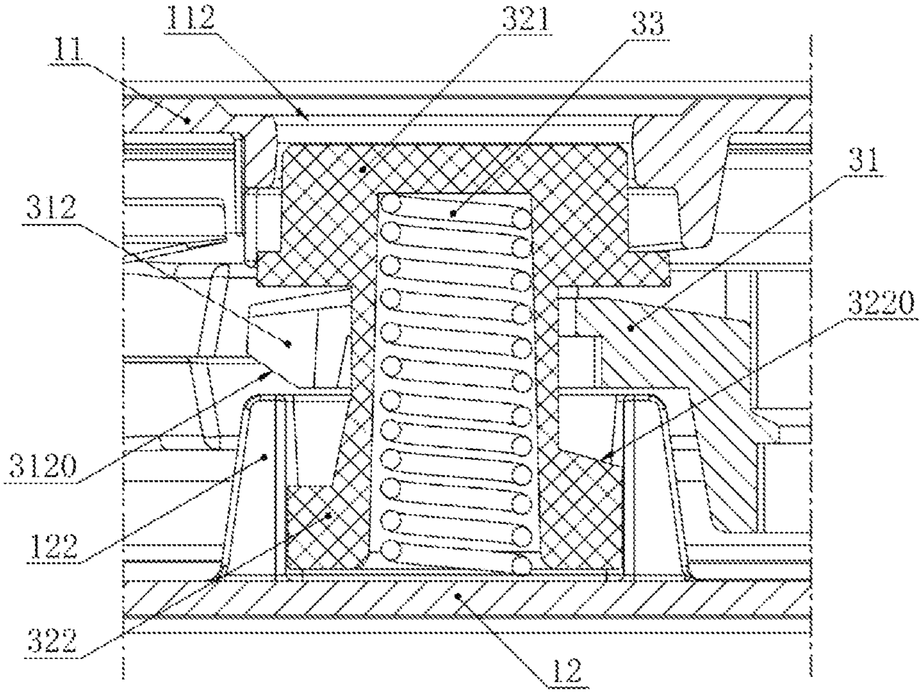
FIG. 19 is a schematic diagram of a state when the locking member unlocks the storage frame according to the present disclosure.

Specifically, as shown in FIG. 17 to FIG. 19, a front end of the fastening portion 312 is provided with an inclined first guide surface 3120; and an upper end surface of the locking block 322 is an inclined second guide surface 3220. When the storage frame 31 is moved into the inner cavity 100, the fastening portion 312 may press the second guide surface 3220 of the locking block 322 through the first guide surface 3120, to drive the locking block 322 to move downward along the positioning base 122 and compress the second spring 33. When the fastening portion 312 crosses the front side of the locking block 322, the locking block 322 is automatically engaged with the fastening portion 312 under an elastic restoring force of the second spring 33.

In this embodiment, as shown in FIG. 9, a press block 117 is arranged on the inner side of the upper housing 11, and the press block 117 corresponds to a position of the accommodating cavity 311. Therefore, when the accommodating cavity 311 of the storage frame 31 is stored in the inner cavity 100, the press block 117 may extend into the accommodating cavity 311, to limit the new blade 400 stored in the accommodating cavity 311.

It can be understood that, multiple new blades 400 may be stored in the accommodating cavity 311, so a depth of the accommodating cavity 311 is much greater than a thickness of a single blade 400. During use of the cutter, the blade 400 may shake in the accommodating cavity 311, and may even fall off from the accommodating cavity 311. With the arrangement of the press block 117 on the inner side of the upper housing 11, when the storage frame 31 is stored in the inner cavity 100, an end portion of the press block 117 is even with or slightly extends into the accommodating cavity 311, to limit the vertical movement of the blades 400 stored in the accommodating cavity 311, and prevent the blades 400 from being scattered in the inner cavity 100.

In this embodiment, as shown in FIG. 1 and FIG. 3, because the storage frame 31 and the locking member 32 may be locked and fastened to each other, i.e., the storage frame 31 provides a sufficient limiting force when being locked, the arrangement of the above limiting structure may be omitted during mounting of the anti-skid strip 13, and the mounted anti-skid strip 13 is directly limited by the storage frame 31.

In order to facilitate understanding, a specific usage process of the storage assembly 3 will be described in detail below.

(1) When the storage frame 31 is stored in the inner cavity 100 of the shank 1, as shown in FIG. 1, FIG. 2, and FIG. 18, the fastening portion 312 at a front portion of the storage frame 31 is engaged with the front side of the locking block 322 of the locking member 32, so that the freedom of movement of the storage frame 31 in a front-rear direction of the shank 1 is limited. This ensures that the storage frame 31 can store multiple new blades 400 into the inner cavity 100.

(2) When the blade of the cutter needs to be replaced with a new one, as shown in FIG. 19 and FIG. 20, the pressing block 321 is pressed downward along the second through slot 112 to drive the locking block 322 to move downward along the positioning base 122 and compress the second spring 33, until the locking block 322 disengages from the fastening portion 312 of the storage frame 31. Then, the user can directly pull the storage frame 31 out of the inner cavity and take out one of the new blades 400 stored in the accommodating cavity 311.

(3) After the new blade 400 is taken out, as shown in FIG. 18 and FIG. 19, the storage frame 31 is inserted back into the inner cavity 100. During the insertion of the storage frame 31, the first guide surface 3120 at the front end of the storage frame 31 presses the second guide surface 3220 on the upper end surface of the locking block 322, to drive the locking block 322 to move downward along the positioning base 122 and compress the second spring 33. When the fastening portion 312 of the storage frame 31 crosses the locking block 322, the locking block 322 is lifted by the elastic force of the second spring 33, so that the front side of the locking block 322 is engaged with the fastening portion 312.

The basic principles, main features and advantages of the present disclosure have been described above. Those skilled in the art should understand that the present disclosure is not limited to the above-mentioned embodiments. The descriptions of the embodiments and the specification are only for illustrating the principles of the present disclosure. Various changes and improvements may be made to the present disclosure without departing from the spirit and scope of the present disclosure, and such changes and improvements all fall within the scope of protection claimed by the present disclosure. The scope of protection claimed by the present disclosure is defined by the appended claims and equivalents thereof.

REFERENCE SIGNS LIST

In the drawings: shank 1, inner cavity 100, cutting area 101, claw portion 102, upper housing 11, first through slot 111, first locking groove 1111, second locking groove 1112, third locking groove 1113, second through slot 112, engagement slot 113, limiting groove 1130, first claw plate 114, contact surface 115, chamfer surface 116, press block 117, lower housing 12, second claw plate 121, positioning base 122, anti-skid strip 13, buckling portion 131, limiting block 132, adjustment assembly 2, supporting plate 21, mounting portion 211, positioning rib 2111, positioning column 2112, positioning groove 212, positioning hole 2120, first spring 22, adjustable block 23, engaging block 231, positioning rod 232, storage assembly 3, storage frame 31, accommodating cavity 311, fastening portion 312, first guide surface 3120, locking member 32, pressing block 321, locking block 322, second guide surface 3220, second spring 33, blade 400, to-be-cut workpiece 500.

What is claimed is:

1. A multifunctional cutter, comprising:
- a blade;
- a shank, wherein a front side of the shank is provided with a cutting area, and an inner cavity of the shank is respectively communicated with a front end of the shank and the cutting area; and
- an adjustment assembly, wherein the blade is detachably mounted at a front portion of the adjustment assembly; the adjustment assembly is mounted in the inner cavity, and the adjustment assembly is configured to drive, under driving on an outer portion of the shank, the blade to slide along the inner cavity;
- wherein the blade is configured for cutting when the blade moves to a position where a rear side of the blade is located in the cutting area;
- the blade is configured for shoveling when the blade moves to a position where a front side of the blade is located outside the front end of the shank; and
- the blade is configured for being replaced when the blade moves to a position where the blade is entirely located outside the front end of the shank.

2. The multifunctional cutter according to claim 1, wherein the front side of the shank is provided with an inclined contact surface; and the front side of the shank is provided with a claw portion, the claw portion and the contact surface cooperate with each other to form the cutting area, and an opening direction of the cutting area is inclined relative to an extension direction of the shank.

3. The multifunctional cutter according to claim 2, wherein an upper end and/or a lower end of the contact surface are/is each provided with a chamfer surface, so that when the blade is used to cut a to-be-cut workpiece, the blade is configured for inclined cutting.

4. The multifunctional cutter according to claim 1, wherein an upper side of the shank is provided with a first through slot communicated with the inner cavity; the adjustment assembly comprises:
- a supporting plate, wherein the supporting plate is slidably mounted in the inner cavity, and the blade is mounted at a front portion of the supporting plate; and
- an adjustable block, wherein the adjustable block is elastically mounted on the supporting plate and extends into the first through slot;
- when the blade is located at a predetermined position, the adjustable block is configured for locking to the shank by a locking structure; and
- when a position of the blade needs to be adjusted, the adjustable block is operated to release the locking by the locking structure, and the supporting plate is driven to drive the blade to move.

5. The multifunctional cutter according to claim 4, wherein the locking structure comprises:
- an engaging block, arranged on a side portion of the adjustable block; and
- at least two locking grooves, arranged at intervals along a side of an extension direction of the first through slot;

wherein locking of the blade at a predetermined position is realized through engagement of the engaging block with the locking grooves at a predetermined position; and the adjustable block is pressed to drive the engaging block to disengage from the corresponding locking grooves, to release the locking of the blade at the predetermined position.

6. The multifunctional cutter according to claim 1, wherein the multifunctional cutter further comprises a storage assembly, the storage assembly is mounted at a rear portion of the shank, an accommodating cavity configured to be storable in the inner cavity is provided on the storage assembly, and the accommodating cavity is configured to store a new blade; and the blade in the accommodating cavity is used for replacing the blade located in the adjustment assembly.

7. The multifunctional cutter according to claim 6, wherein the storage assembly comprises:

a locking member, wherein the locking member is elastically and slidably mounted in the inner cavity and extends to outside of the shank; and a storage frame, wherein the accommodating cavity is arranged in the storage frame; the storage frame is configured to extend into the inner cavity along an opening of a rear end of the shank and be locked by the locking member; and when the blade is to be replaced, the locking member is pressed to unlock the storage frame.

8. The multifunctional cutter according to claim 7, wherein a fastening portion is arranged at a front end of the storage frame; the locking member comprises:

a pressing block, wherein the pressing block is configured to extend to the outside of the shank; and a locking block, wherein the locking block is spaced apart from and fixed to the pressing block; the locking block is elastically and slidably mounted in the inner cavity through an elastic member;

when the storage frame is moved into the inner cavity, the fastening portion is configured to be engaged with a front side of the locking block; and when the pressing block is pressed, the locking block is configured to be moved downward to disengage from the fastening portion.

9. The multifunctional cutter according to claim 8, wherein a front end of the fastening portion is provided with an inclined first guide surface; an upper end surface of the locking block is an inclined second guide surface; and when the storage frame is moved into the inner cavity, the fastening portion is configured to press the second guide surface through the first guide surface to drive the locking block to move downward, and when the fastening portion crosses the front side of the locking block, the locking block is configured to engage with the fastening portion under an elastic restoring force.

10. The multifunctional cutter according to claim 6, wherein the shank comprises a shell and two anti-skid strips; engagement slots are respectively provided on a left side and a right side of the shell; the anti-skid strips are configured to slidably engage with the engagement slots on corresponding sides of the shell; and the anti-skid strips are configured to be limited by the storage assembly; or, the anti-skid strips and the engagement slots are limited by a limiting structure.

* * * * *